(12) United States Patent
Zhao et al.

(10) Patent No.: US 12,689,209 B2
(45) Date of Patent: Jul. 21, 2026

(54) VOLTAGE CLAMPING CIRCUIT FOR SOLID STATE CIRCUIT BREAKERS

(71) Applicant: ABB Schweiz AG, Baden (CH)

(72) Inventors: Shuyan Zhao, Raleigh, NC (US);
Chunmeng Xu, Raleigh, NC (US);
Lakshmi Ravi, Raleigh, NC (US);
Zhou Dong, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 226 days.

(21) Appl. No.: 18/611,970

(22) Filed: Mar. 21, 2024

(65) Prior Publication Data

US 2025/0300453 A1     Sep. 25, 2025

(51) Int. Cl.
| | |
|---|---|
| *H02H 9/04* | (2006.01) |
| *H01C 7/12* | (2006.01) |
| *H01H 71/12* | (2006.01) |
| *H02M 1/34* | (2007.01) |

(52) U.S. Cl.
CPC .............. *H02H 9/042* (2013.01); *H01C 7/12* (2013.01); *H01H 71/123* (2013.01); *H02H 9/044* (2013.01); *H02M 1/344* (2021.05)

(58) Field of Classification Search
CPC ......... H02H 9/04; H02H 9/042; H02H 9/044; H02H 3/087; H01C 7/12; H01H 71/12; H01H 71/123; H01H 9/548; H02M 1/34; H02M 1/344; H03K 17/102
USPC ...................................... 361/3–13, 117–120
See application file for complete search history.

(56) References Cited

U.S. PATENT DOCUMENTS

| | | | |
|---|---|---|---|
| 10,276,321 B2 | 4/2019 | Kennedy et al. | |
| 11,362,512 B2 | 6/2022 | Schierling et al. | |
| 11,431,164 B2 | 8/2022 | Schork et al. | |
| 11,641,103 B2 | 5/2023 | Song et al. | |
| 2015/0002977 A1* | 1/2015 | Dupraz .................. H01H 9/542 | |
| | | | 361/115 |
| 2015/0022928 A1* | 1/2015 | Mohaddes Khorassani ................ | |
| | | | H02H 3/08 |
| | | | 361/93.7 |
| 2020/0028359 A1* | 1/2020 | Garbi ............... H03K 17/08148 | |
| 2021/0091561 A1* | 3/2021 | Schierling ................ H01B 3/20 | |
| 2021/0305980 A1* | 9/2021 | Sim ........................ H02H 7/008 | |
| 2022/0014185 A1 | 1/2022 | Handt et al. | |

(Continued)

OTHER PUBLICATIONS

Zhao et al., "Implementing Diode-Free MOV-RCV Snubber Based DC Solid-State Circuit Breakers," *IEEE J. of Emerging and Selected Topics in Industrial Electronics*, 5(1): 298-306 (Jan. 5, 2024).

(Continued)

*Primary Examiner* — Danny Nguyen
(74) *Attorney, Agent, or Firm* — Fitch Even Tabin & Flannery LLP

(57) ABSTRACT
A power semiconductor circuit is provided for clamping the voltage across the circuit during a fault. The circuit may include a power semiconductor switch, a clamping branch coupled in parallel with the power semiconductor switch, a snubber branch coupled in parallel with the power semiconductor switch and the clamping branch, and an isolation switch coupled in series with the power semiconductor switch. The clamping branch may include a first capacitor and a surge arrester coupled in parallel with a first resistor. The first capacitor may be coupled in series with the surge arrester and the first resistor. The snubber branch may include a second capacitor, a plurality of resistors, and a diode.

17 Claims, 8 Drawing Sheets

(56)     References Cited

U.S. PATENT DOCUMENTS

| | | | |
|---|---|---|---|
| 2022/0182051 A1* | 6/2022 | Handt | G01R 27/16 |
| 2022/0329063 A1* | 10/2022 | Zhang | H01C 7/12 |
| 2023/0163587 A1* | 5/2023 | Lu | H03K 17/08142 |
| | | | 361/93.1 |

OTHER PUBLICATIONS

European Patent Office, Extended European Search Report in European Patent Application No. 25162593.5, 11 pp. (Aug. 4, 2025).

Camurca et al., "Passive Clamping Circuit for Reduced Switch Count in Solid State Circuit Breakers," 2021 *IEEE 15th International Conference on Compatibility, Power Electronics and Power Engineering* (*CPE-POWERENG*), 6 pp. (Jul. 14-16, 2021).

Song et al., "Survey and Experimental Evaluation of Voltage Clamping Components for Solid State Circuit Breakers," 2021 *IEEE Applied Power Electronics Conference and Exposition* (*APEC*), 401-406 (Jun. 14-17, 2021).

Zhao et al., "A Diode-Free MOV$^2$-RC Snubber for Solid-State Circuit Breaker," 2022 *IEEE Transportation Electrification Conference & Expo* (*ITEC*), 497-502 (Jun. 15-17, 2022).

* cited by examiner

VOLTAGE CLAMPING CIRCUIT FOR SOLID STATE CIRCUIT BREAKERS

FIELD

The present disclosure relates to systems and methods for dissipating energy from current interruption events using power semiconductor circuit breaker with cascading power semiconductor switches and voltage clamping circuit.

BACKGROUND

The present disclosure is directed, generally, to power semiconductor switching devices for dissipating energy when opening the device in response to detecting a fault or overcurrent. Previous systems for dissipating energy in a power semiconductor switching device involve using a metal oxide varistor (MOV) connected in parallel with the semiconductor device. However, this incurs a high switching overcurrent of 2 to 3 times the nominal system voltage that may damage power semiconductor switches and other voltage-sensitive components in the system. Using a higher voltage rated semiconductor to withstand the switching overcurrent may be a solution. However, this can greatly raise the cost of the power semiconductor switch, increase the conduction loss, and impose undesirable size requirements in components or facilities which wish to incorporate such power semiconductor switching devices. Moreover, conventional power semiconductor switching devices which utilize an MOV and capacitor in parallel may be slow to establish voltage redistribution/stabilization increasing the total breaking speed and therefore, also the duration needed until the switching devices can be closed and placed back into an on state for reuse.

SUMMARY

An embodiment of the present disclosure provides a power semiconductor circuit including a power semiconductor switch, a clamping branch coupled in parallel with the power semiconductor switch, a snubber branch coupled in parallel with the power semiconductor switch and the clamping branch, and an isolation switch coupled in series with the power semiconductor switch. The clamping branch includes a first capacitor, and a surge arrester coupled in parallel with a first resistor, wherein the first capacitor is coupled in series with the surge arrester and the first resistor. The snubber branch includes a second capacitor, a plurality of resistors, and a diode.

In an embodiment, the power semiconductor switch changes to an off state in response to a fault occurring on a load side of the power semiconductor circuit.

In an embodiment, the isolation switch is configured to change to the off state upon expiration of a certain time period subsequent to the power semiconductor switch changing to the off state to block leakage current.

In an embodiment, a current corresponding to the fault is directed to the snubber branch in response to the power semiconductor switch changing to the off state.

In an embodiment, the current corresponding to the fault is directed to the clamping branch in response to the surge arrester reaching a clamping voltage.

In an embodiment, the current corresponding to the fault decreases in magnitude in response to the clamping voltage being greater than a direct current (DC) voltage of source voltage of the power semiconductor circuit.

In an embodiment, the plurality of resistors are coupled in parallel with the diode and the second capacitor.

In an embodiment, the diode is coupled in series with the second capacitor.

In an embodiment, the surge arrester is a varistor or a metal oxide varistor (MOV).

In an embodiment, the power semiconductor switch includes at least one of a metal-oxide-semiconductor field-effect transistor (MOSFET) switch, an insulated-gate bipolar transistor (IGBT) switch, integrated gate-commutated thyristors (IGCTs), bipolar transistors, Darlington transistors, field effect transistors (FETs), silicon controlled rectifiers (SCRs), thyristors, triacs, or unijunction transistors.

In an embodiment, the power semiconductor switch changes to an on state in response to a current of the fault being dissipated via the snubber branch and the clamping branch to discharge the first capacitor, and wherein the isolation switch turns to the on state after a preset interval to prepare for reclosing.

In an embodiment, the power semiconductor circuit further includes another power semiconductor switch coupled in series with the power semiconductor switch and coupled in parallel with the snubber branch and the clamping branch, wherein the power semiconductor switch and the other power semiconductor switch provide bidirectional power switching for the power semiconductor circuit.

In an embodiment, the snubber branch further includes a third capacitor and another diode.

Another embodiment of the present disclosure provides a power semiconductor circuit including a power semiconductor switch, a clamping branch coupled in parallel with the power semiconductor switch, and a snubber branch coupled in parallel with the power semiconductor switch and the clamping branch. The clamping branch includes a first capacitor, and a surge arrester coupled in parallel with a first resistor, wherein the first capacitor is coupled in series with the surge arrester and the first resistor. The snubber branch includes a second capacitor, a resistor, and a diode.

In an embodiment, the power semiconductor circuit further includes an isolation switch coupled in series with the power semiconductor switch.

In an embodiment, the power semiconductor switch changes to an off state in response to a fault occurring on a load side of the power semiconductor circuit, and wherein the isolation switch is configured to change to the off state upon expiration of a certain time period subsequent to the power semiconductor switch changing to the off state to block leakage current.

In an embodiment, the power semiconductor circuit further includes a plurality of diodes coupled in parallel with the clamping branch and the snubber branch.

Another embodiment of the present disclosure provides a power semiconductor circuit including a power semiconductor switch, a clamping branch coupled in parallel with the power semiconductor switch, and an isolation switch coupled in series with the power semiconductor switch. The clamping branch includes a first capacitor, and a surge arrester coupled in parallel with a first resistor, wherein the first capacitor is coupled in series with the surge arrester and the first resistor.

In an embodiment, the power semiconductor circuit further includes a snubber branch coupled in parallel with the power semiconductor switch and the clamping branch. The snubber branch includes a second capacitor, a plurality of resistors, and a plurality of diodes.

In an embodiment, the power semiconductor circuit further includes a snubber branch coupled in parallel with the power semiconductor switch and the clamping branch. The snubber branch includes a second capacitor, and a plurality of resistors.

BRIEF DESCRIPTION OF THE DRAWINGS

The present disclosure will be described in even greater detail below based on the exemplary figures. The disclosure is not limited to the exemplary embodiments. All features described and/or illustrated herein can be used alone or combined in different combinations in embodiments of the disclosure. The features and advantages of various embodiments of the present disclosure will become apparent by reading the following detailed description with reference to the attached drawings which illustrate the following.

DETAILED DESCRIPTION

Embodiments of the present disclosure provide for a voltage clamping circuit and related operation sequence in direct-current (DC) solid-state circuit breakers (SSCBs) with a cascaded submodule topology (branches). While the present disclosure is described primarily in connection with SSCBs in DC power systems, as would be recognized by a person of ordinary skill in the art, the disclosure is not so limited and inventive features apply to other circuit breaker types and alternating current (AC) sources.

According to aspects of the present disclosure, a novel voltage clamping circuit with a cascaded submodule topology for SSCBs is described which provides solutions to problems associated with conventional circuit breakers and voltage clamping systems. For example, the novel system described herein utilizes a voltage clamping branch that includes a MOV-resistor-capacitor circuit that provides multiple benefits. For example, through the use of this voltage clamping branch (clamping branch) the circuit may reduce transient overcurrent ratio (e.g., the ratio between peak SSCB voltage and system DC voltage), reduce static leakage current, and accelerate reclosing and reopening speed of the SSCB. The features described herein also provide for cooperation between the main power switches of the main branch and a mechanical galvanic switch (isolation switch) that are used in conjunction with the voltage clamping circuit. This enables quick reclosing of the SSCB with immediate reopening capability for reuse of the circuit once a fault has been cleared or the energy dissipated. Embodiments of the circuits described herein include the main power switch and voltage clamping circuit being combined with a resistor-resistor-capacitor-diode ($R^2CD$) circuit.

All three branches or circuits may be packaged as a submodule. The $R^2CD$ circuit includes an optional RCD snubber for dv/dt control and a static balancing resistor $R_{static}$ which can be used for voltage balancing in use cases where cascaded submodules are used. The $R^2CD$ circuit may also be substituted for a $R^2C$ network or circuit which can serve a similar purpose as the $R^2CD$ circuit. In embodiments, multiple submodules of the main branch, clamping branch, and $R^2CD$ snubber branch may be cascaded in series to support higher voltage systems. By cascading multiple submodules the system can achieve transient and static voltage balancing of main solid-state switches. Conventional circuits fail to provide the benefits of the architectures and circuits described herein and instead rely on circuits which increase the size and cost of circuit breakers while taking longer to reclose a circuit for reuse. The description below with reference to FIGS. 1 and 2 describe conventional circuits and problems associated with each design that are solved by the novel circuit described herein.

Figure 1:
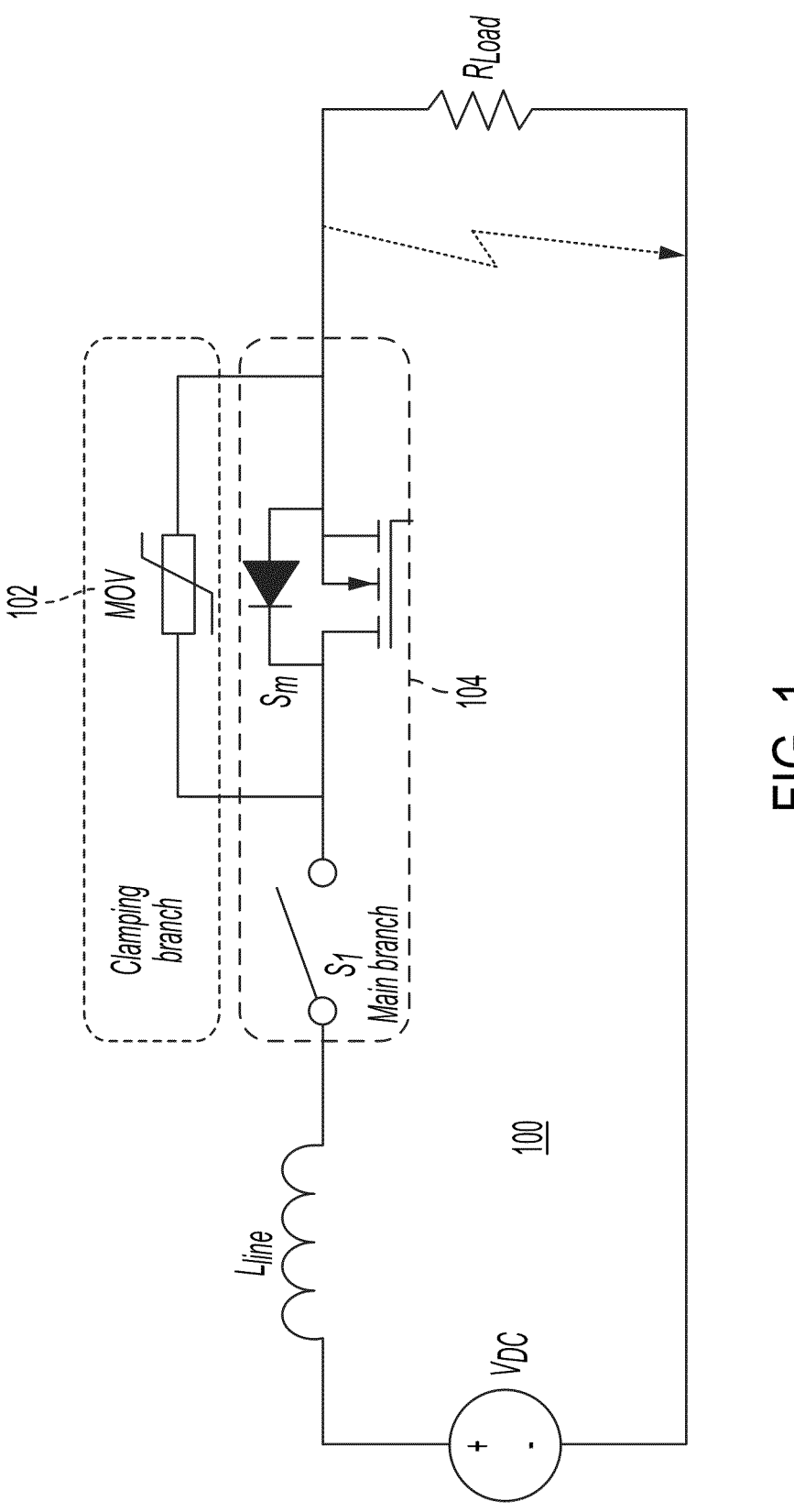
FIG. 1 illustrates an example schematic of a conventional power semiconductor circuit.

FIG. 1 illustrates an example schematic of a conventional power semiconductor circuit 100. Conventional circuits which utilize only MOVs (such as MOV 102) in a voltage clamping branch or circuit of SSCBs is that they result in at least two times overcurrent buildup during fault interruption. The type of architecture depicted in FIG. 1 also results in a fast-front overcurrent spike with an excessive dv/dt that may damage the main power switch 104. The conventional power semiconductor circuit 100 uses the parallel MOV 102 in the clamping branch to dissipate or absorb the inductive energy in the loop. Although this design itself is low cost, it results in a significant overdesign of the main power semiconductor switches (104) regarding the maximum voltage blocking capability which is costly and lossy. Characteristics of most MOVs require the protected power semiconductor switches to have a maximum voltage blocking rating of at least two times the nominal system voltage rating. Eventually as systems scale larger or require higher voltage the extra investment resulting from power switch overdesign is higher than the cost savings of the clamping circuit.

Some conventional systems add a snubber in parallel with the energy dissipating high-voltage MOV (102) to eliminate the dv/dt problem. These types of snubber branches may be in parallel with the main branch and clamping branch of a conventional circuit and consist of a low-voltage MOV, snubber resistor, and a snubber capacitor. This capacitor is used to reduce switching transient dv/dt and as such its capacitance value is very low. The voltage rating of the MOV in this snubber branch must be low since it should fully conduct to provide a charging path to the snubber branch. This design still has problems in terms of the costly overdesign of the main power semiconductor switches regarding the maximum voltage blocking capability since the voltage clamping function is still performed by the directly paralleled MOV (102). This is because the low-voltage MOV of the snubber branch in series with the snubber capacitor serves a limited amount of energy filtering.

Figure 2:
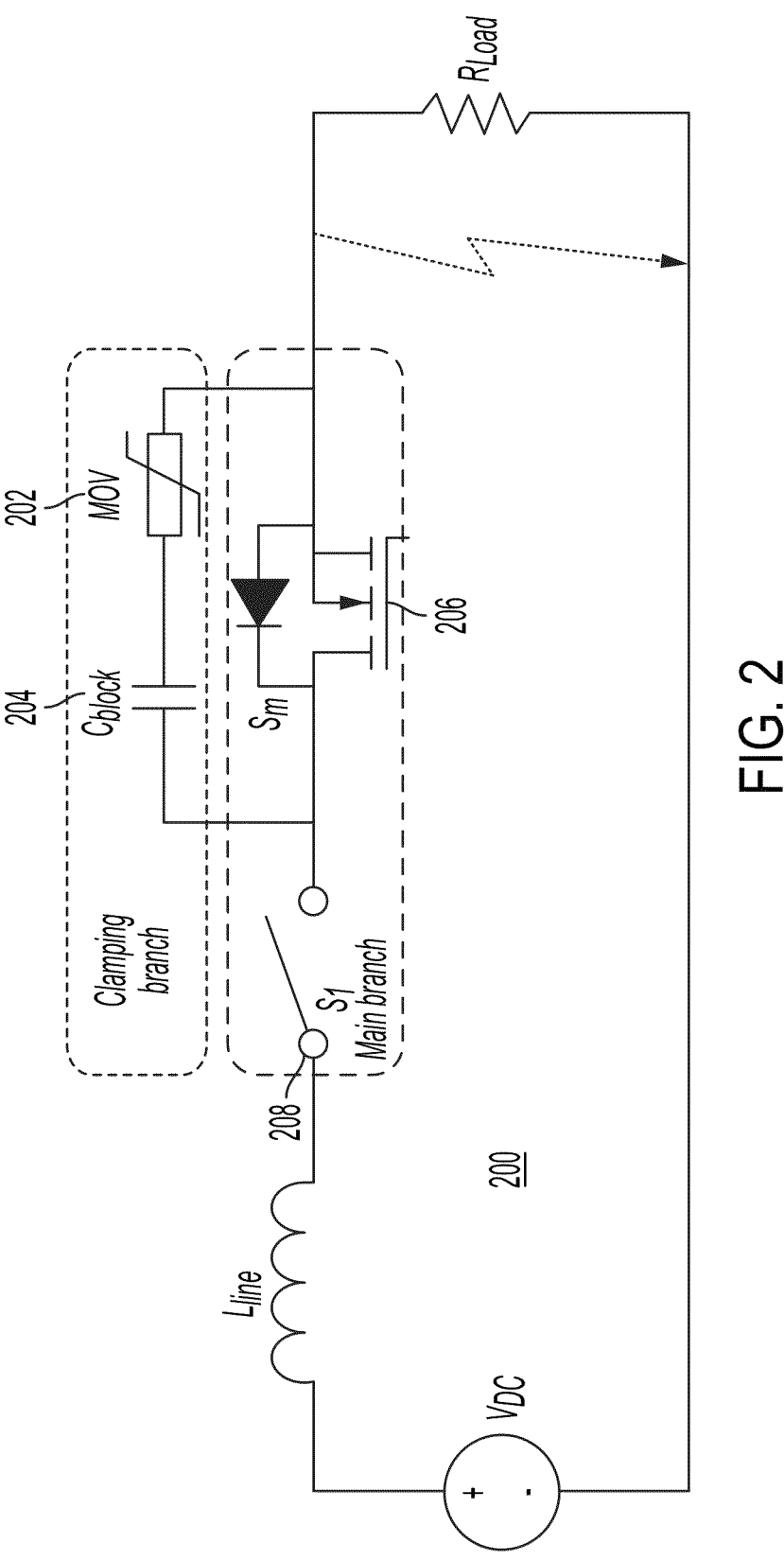
FIG. 2 illustrates an example schematic of a conventional power semiconductor circuit.

FIG. 2 illustrates an example schematic of a conventional power semiconductor circuit 200. The conventional power semiconductor circuit 200 of FIG. 2 moves the combination of MOV 202 and capacitor 204 in the energy dissipating branch (clamping branch) to achieve a lower overcurrent ratio. The problem with the design depicted in FIG. 2 is the very slow charging speed for the capacitor 204 to reach DC blocking voltage which results in the total fault interruption time being significantly increased. The design depicted in FIG. 2 also fails to provide a reliable reopening after the power switching device 206 recloses. This design also fails to account for a fast-front dv/dt elimination. The MOV 202 resistance is extremely high after interruption transient is complete and thus the charging time for the capacitor 204 to fully withstand the DC bus voltage is very long thereby significantly increasing the fault interruption time. Similarly, the capacitor 204 can't be discharged in a timely manner after the main power switch 208 recloses resulting in an unreliable reclosing after the power switching device 206 breaks the circuit.

Figure 3:
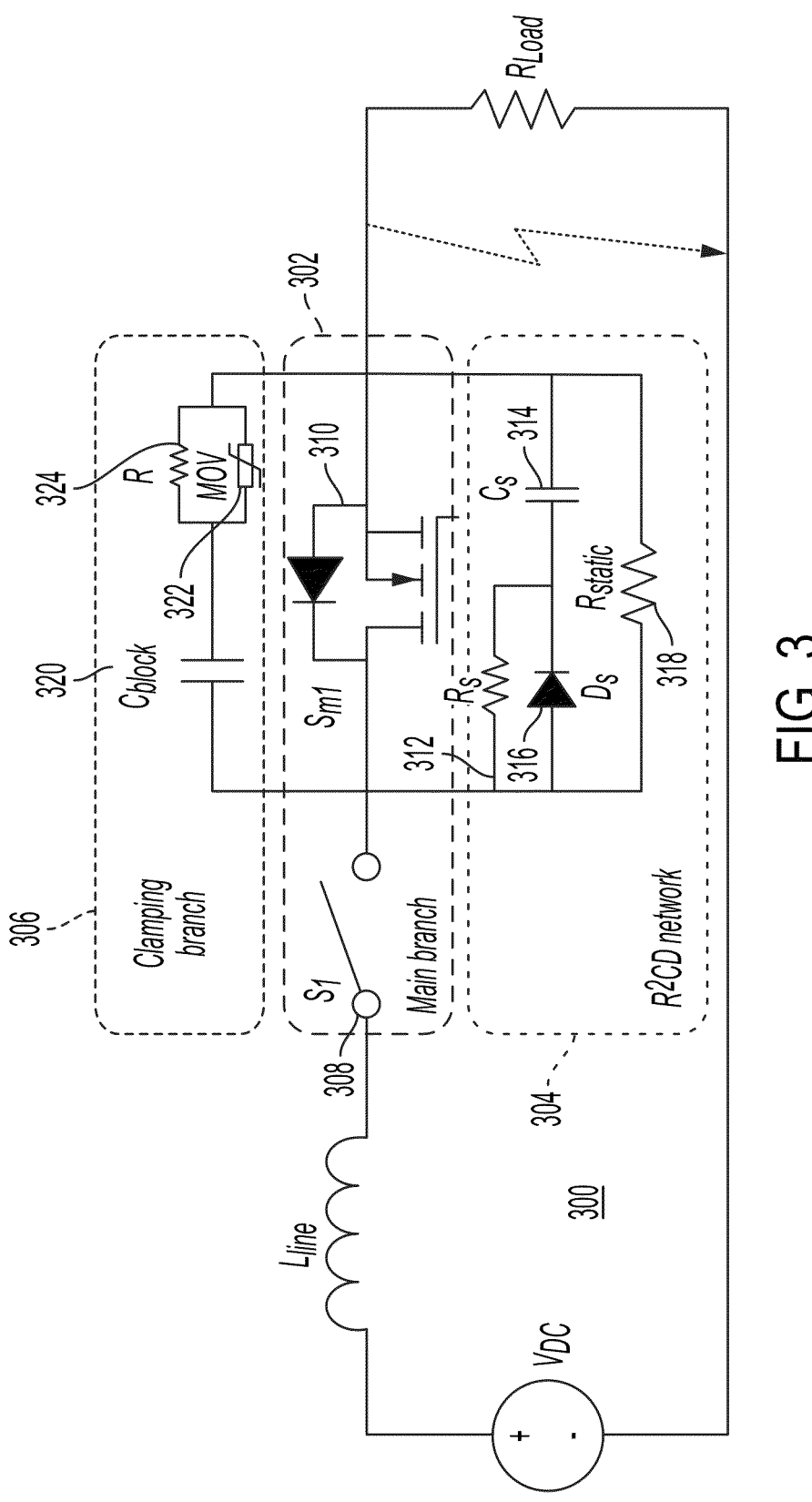
FIG. 3 illustrates a schematic of an embodiment of a power semiconductor circuit.

FIG. 3 illustrates a schematic of an embodiment of a power semiconductor circuit. In an exemplary embodiment, the circuit (power semiconductor circuit 300) described herein includes three branches including a main branch 302, an R²CD network branch 304 (snubber branch), and a voltage clamping branch 306 (clamping branch). A mechanical switch 308 may also be in series with the three branches 302, 304, and 306. The main branch 302 may include a solid-state power switch 310 (S$_m$) which conducts to supply a load at normal operation mode and cuts off at interruption transient. Examples of the solid-state power switch 310 may include metal-oxide-semiconductor field-effect transistor (MOSFET) switch, an insulated-gate bipolar transistor (IGBT) switch, bipolar junction transistors (BGTs), gate turn-off thyristors (GTOs), MOS-controlled thyristors (MCTs), integrated gate-commutated thyristors (IGCTs), silicon carbide (SiC) switches, gallium nitride (GaN) switches, or any other type of semiconductor switch that controls current flow to power electrical equipment. The R²CD network branch 304 or snubber branch may include a resistor (312)—capacitor (314)—diode (316) (RCD) snubber and a static resistor 318 in parallel. The RCD snubber (312-316) may be optional and is used for reducing the high dv/dt of the main switch 310 during interruption transient. The voltage clamping branch 306 (clamping branch) may include a DC blocking capacitor 320 (C$_{block}$), a high voltage MOV 322, and a parallel resistor 324 R. In embodiments, the clamping voltage of the MOV 322 is higher than the DC system voltage to void excessive impact on the switching speed of the total power switching device. The MOV 322 may be a surge arrester including a varistor.

The mechanical switch 308 (S$_1$) may be in series with the three branches 302-306 and provide reliable galvanic disconnect after the interruption is completed. As described herein it follows proper cooperation sequences with the main power semiconductor switch 310 (S$_m$) to achieve faster reclosing of the circuit 300.

Figure 4:
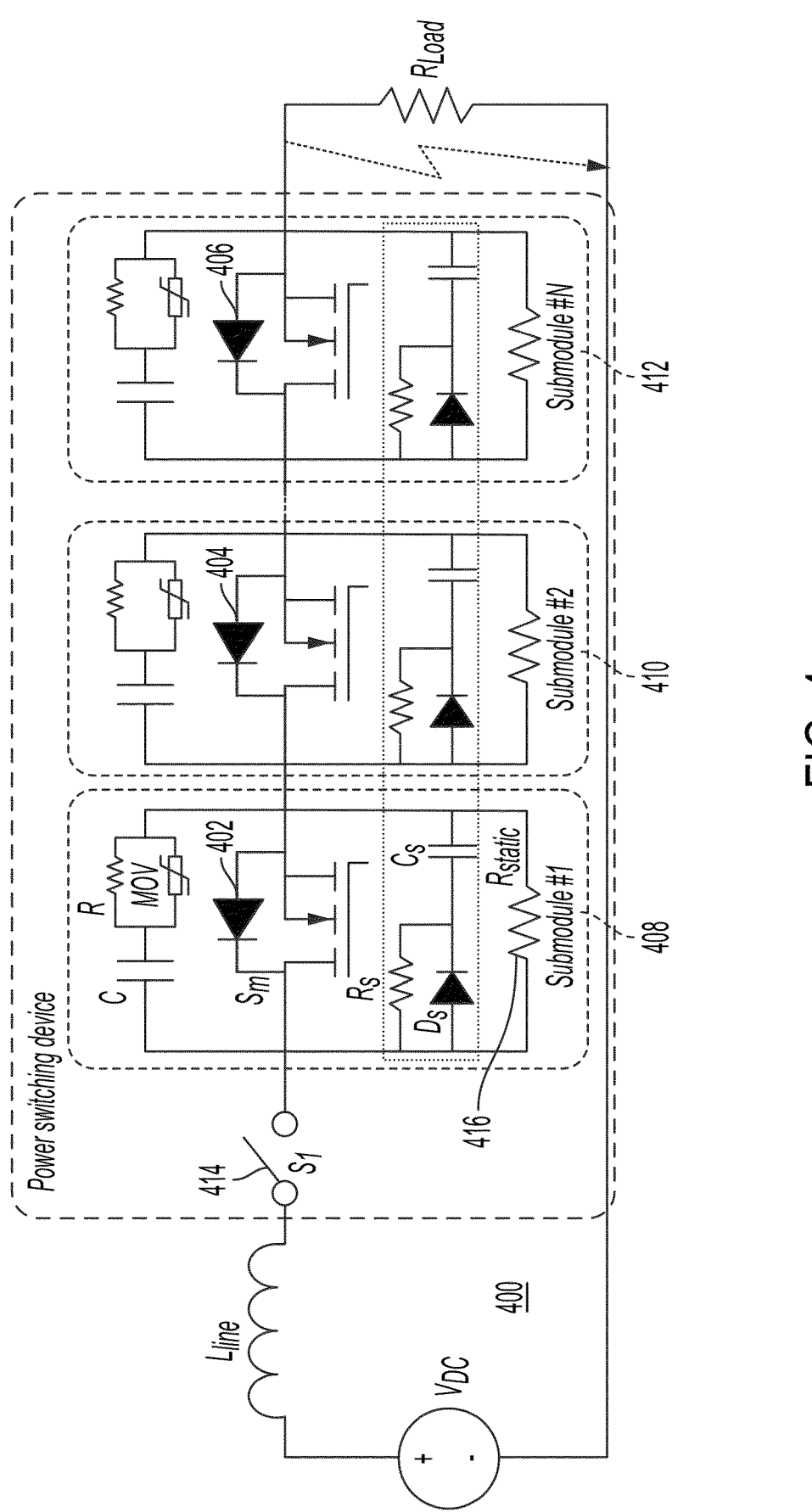
FIG. 4 illustrates a schematic of an embodiment of a power semiconductor circuit with cascading power semiconductor switches and submodules.

FIG. 4 illustrates a schematic of an embodiment of a power semiconductor circuit 400 with cascading power semiconductor switches 402-406 and submodules 408-412. The power semiconductor circuit 400 of FIG. 4 includes mechanical switch 414 in series with the submodules 408-412. As depicted in FIG. 4, the snubber branch (e.g., RCD snubber) may be optional but the static resistor 416 is included in parallel with the cascading power semiconductor switches 402-406 and clamping branches (e.g., C, R, and MOV). The configuration depicted in FIG. 4 which includes the cascaded submodules 408-412 enables the power semiconductor circuit 400 to accommodate a higher voltage (V$_{DC}$).

Figure 5:
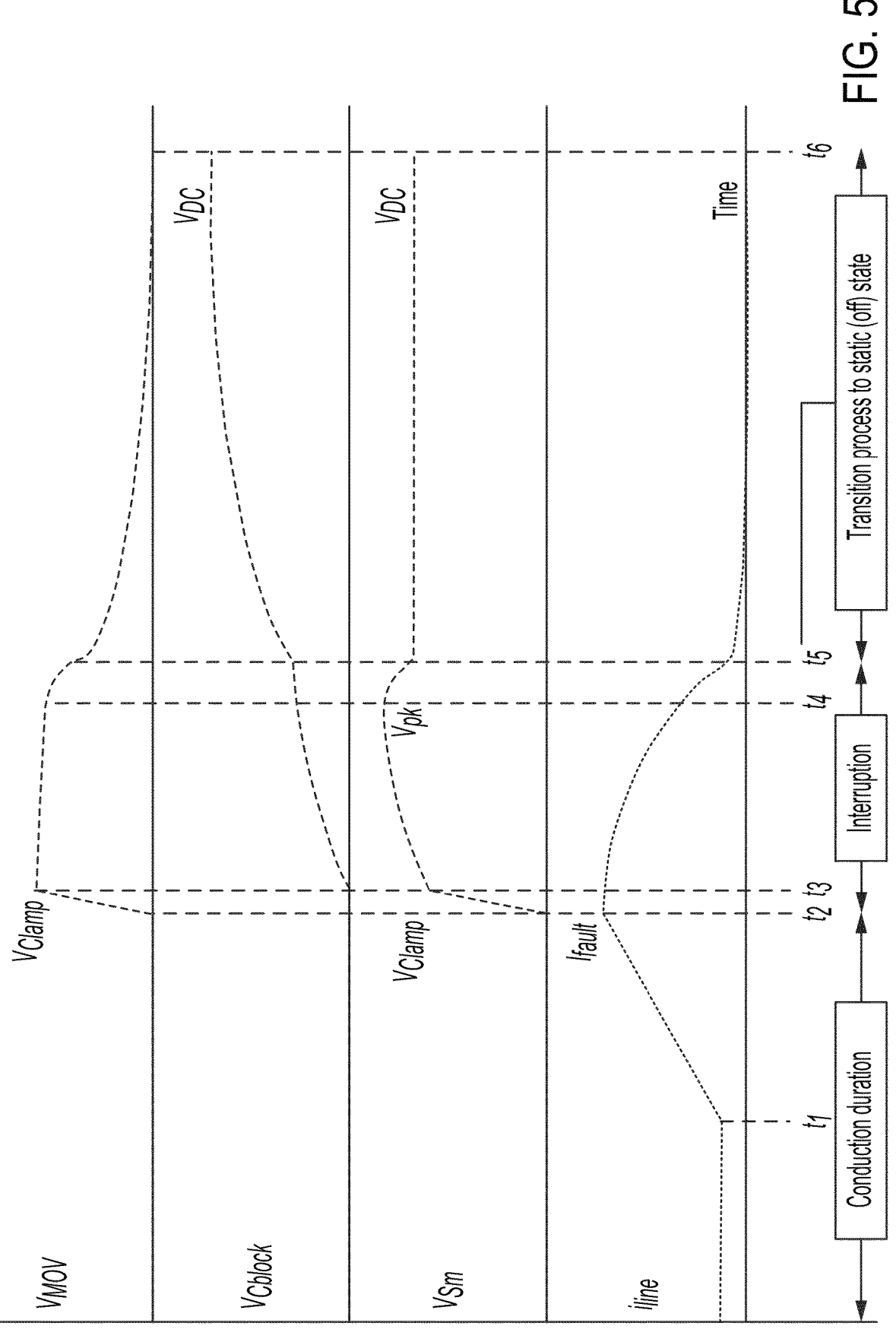
FIG. 5 illustrates example waveforms during a current interruption process using an embodiment of a power semiconductor circuit as described herein.

FIG. 5 illustrates example waveforms during a fault interruption process using an embodiment of a power semiconductor circuit as described herein. An example process associated with what is depicted in FIG. 5 may be performed by an environment or architecture such as in FIG. 3 and by components of FIG. 3. An example process associated with FIG. 5 may include normal conduction being performed by the power semiconductor circuit. The DC source supplies rated power to load through the normal on-state power switching device (e.g., power semiconductor switch) of the main branch. This is reflected in FIG. 5 as the time between t and t$_1$.

An example process associated with FIG. 5 may include a fault occurring in the power semiconductor circuit at the load side. The fault current may flow through the main switch S$_m$. This is reflected in FIG. 5 between t$_1$<t<t$_2$. The conduction duration depicted in FIG. 5 is completed at t=t$_2$. An example process associated with FIG. 5 may include the main power switch (power semiconductor circuit) S$_m$ turning off to cut off the fault. In such a scenario the fault current may commutate to the RCD branch (snubber branch). The snubber capacitor C$_s$ may be charged by the fault current through the diode. At the same time, MOV voltage may also reach its clamping voltage. This is depicted in FIG. 5 between t$_2$<t<t$_3$.

An example process associated with FIG. 5 may include the fault current going through the MOV and being extinguished. When the MOV is completely in its clamping region the line current stops increasing in a timely manner and C$_{block}$ voltage is rising. V$_{Sm}$ reaches its peak V$_{pk}$ at t$_4$ and the overcurrent clamping ratio is calculated as $$\frac{V_{pk}}{V_{DC}},$$

which is much lower than conventional overcurrent clamping ratios. The fault interruption process is completed at t=t$_5$ when the line current falls to a very low level as depicted in FIG. 5 between t$_3$<t<t$_5$.

An example process associated with FIG. 5 may include a transition process to a static off state. The C$_{block}$ voltage may rise by C$_{block}$ charging through the resistor R of the clamping branch. The addition of this resistor R, with relatively low resistance value, in the clamping branch helps shorten the transition duration to the static (off) state which is a benefit of the embodiments disclosed herein. In an example, the capacitor charging for the duration of this step is in the order of tens of milliseconds. This step is depicted in FIG. 5 during t$_5$<t<t$_6$. In embodiments, incorporating the resistor R in the clamping branch accelerates the voltage build-up on the DC-blocking capacitor C$_{block}$.

An example process associated with FIG. 5 may include S$_1$ turning off to achieve galvanic isolation for the power semiconductor circuit. The galvanic switch performs zero-current or low-current contact separation in at this step and is reflected in FIG. 5 at t$_6$<t.

In embodiments, the R²CD snubber may be used to realize switching transient voltage balancing when multiple power switching device submodules are stacked up to support higher voltage systems. R$_{static}$ is for achieving off-state (static) voltage balancing when multiple power switching device submodules are stacked up.

Figure 6:
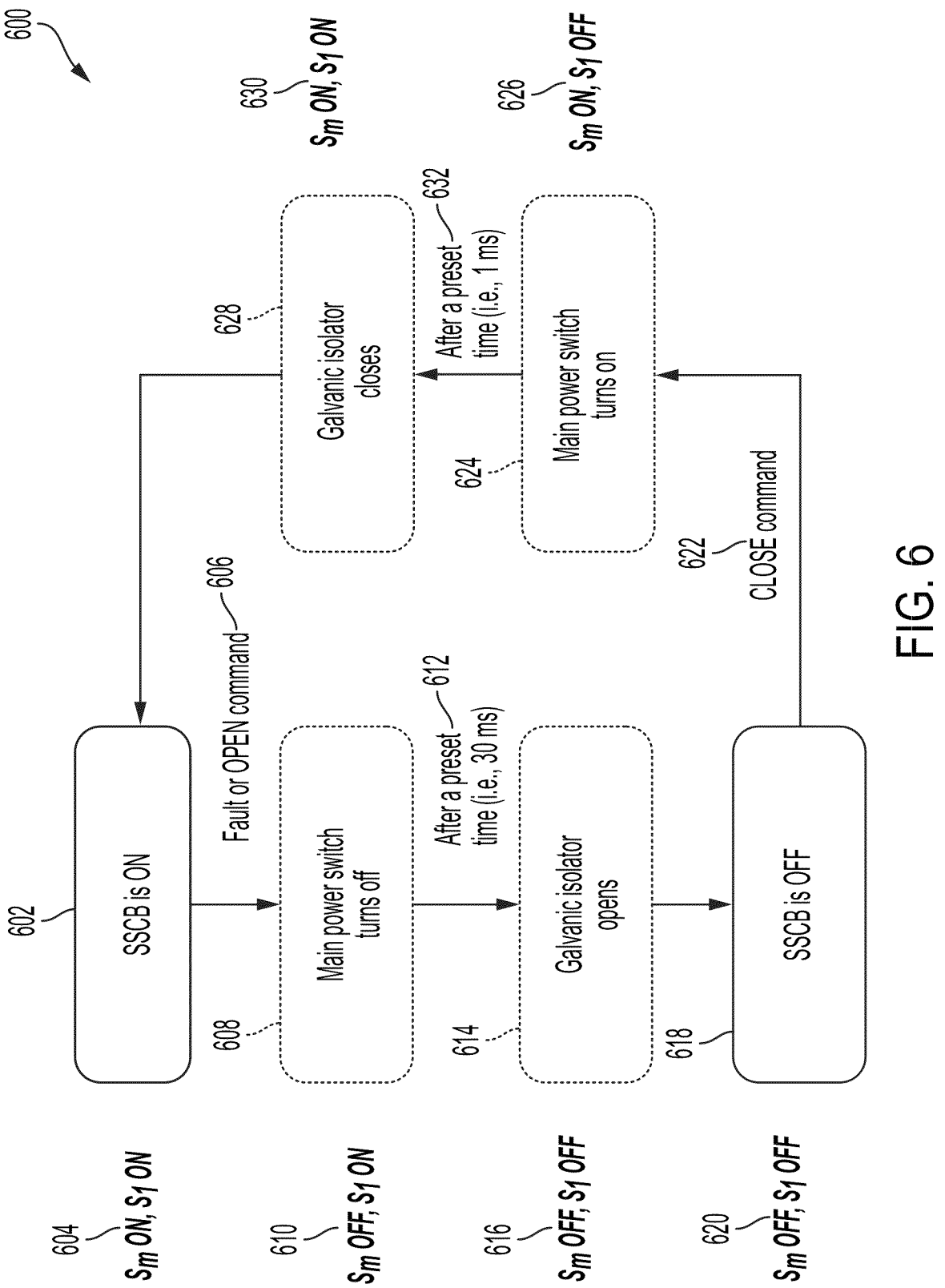
FIG. 6 illustrates a flow chart for opening and closing an embodiment of a power semiconductor circuit during a fault detection and after the fault energy has been dissipated.

FIG. 6 illustrates a flow chart 600 for opening and closing an embodiment of a power semiconductor circuit during a fault detection and after the fault energy has been dissipated. FIG. 6 includes an exemplary process which may be performed by an environment or architecture such as in FIG. 3 and by systems and components of FIG. 3. The flow chart 600 is depicted as being in conjunction with the novel voltage clamping circuit depicted in FIG. 3 that ensures capacitor $C_{block}$ voltage safety upon SSCB opening and SSCB closing. The process depicted in flow chart 600 uses the intrinsic longer reaction delay of mechanical switch $S_1$ than solid-state main switch $S_m$ or a preset time in the microcontroller to ensure the operation sequence. The flow chart 600 depicts steps of the process as well as a state of the power semiconductor switch (main power switch) ($S_m$) and the switch/mechanical switch ($S_1$).

In flow chart 600, at step 602, the power semiconductor switch is in a normal CLOSED state and as depicted at 604 both $S_m$ and $S_1$ are ON to supply rated power to the load. In flow chart 600 a fault occurs at 606 resulting in the power semiconductor switch reacting to interrupt the fault by its trip unit, entering a TRIPPED state (e.g., main power switch turns off at 608) in which $S_m$ is OFF while $S_1$ is still ON, depicted at 610, since mechanical switches have relatively slow speed. In embodiments, a preset delay, such as 30 ms (depicted at 612), is used after the turn-off of $S_m$ (608) so that the mechanical switch $S_1$ can interrupt almost zero capacitor-charging current. The flow chart 600 depicts at step 614 the galvanic isolator opening (mechanical switch/isolation switch) resulting in the SSCB being fully OFF and satisfying a galvanic isolation requirement, if utilized. The states are updated at 616 where $S_m$ is OFF and $S_1$ is off. The flow chart 600 depicts the SSCB being OFF at 618 and the states at 620 remaining OFF for the $S_m$ and $S_1$. During the closing process 622, $S_m$ turns ON 624 first to discharge any initial voltage on the capacitor $C_{block}$ in the flow chart 600. This updates the states of $S_m$ to ON and $S_1$ to OFF at 626. The line current will not flow until $S_1$ is turned ON (e.g., 628 and 630) after a short delay 632, for example 1 ms, the intrinsic longer reaction time of breaker actuator for the mechanical switch $S_1$. This operation sequence embodiment enables fast closing speed.

In flow chart 600, an alternate embodiment of the closing sequence 622 is that $S_m$ turns ON 624 first to discharge any initial voltage on the capacitor $C_{block}$. This updates the states of $S_m$ to ON and $S_1$ to OFF at 626. And after a short delay 632, for example 1 ms, the necessary duration to fully discharge $C_{block}$, $S_m$ turns OFF. Then $S_1$ turns ON with no load. This updates the states of $S_m$ to OFF and $S_1$ to ON. Eventually $S_m$ turns ON to conduct load current wherein the SSCB is in the ON state. This operation sequence embodiment enables fair closing speed and enhanced lifetime of mechanical switch $S_1$.

Figure 7:
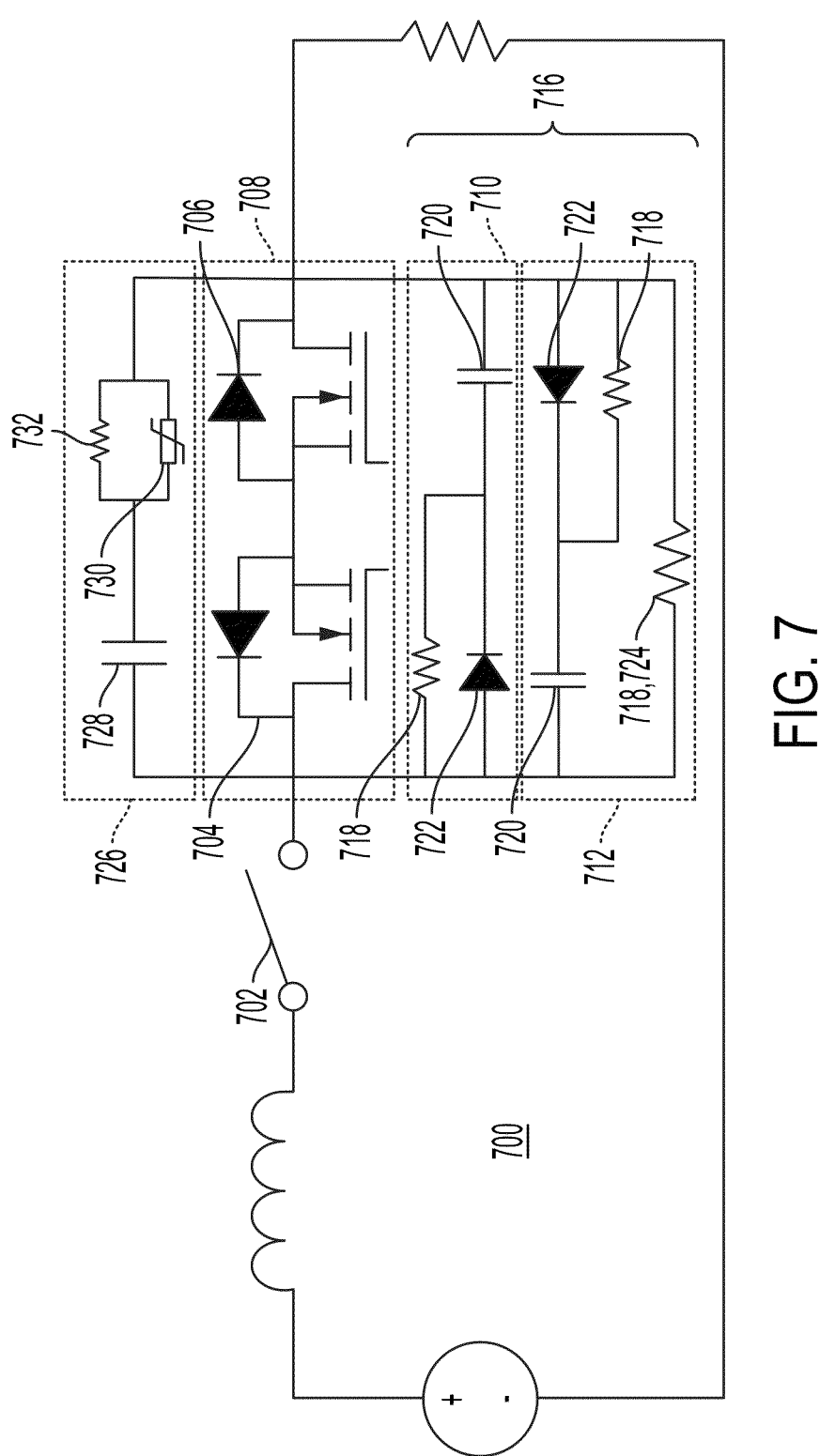
FIG. 7 illustrates a schematic of an embodiment of a power semiconductor circuit with bidirectional power switching using anti-series configured main switches.

FIG. 7 illustrates a schematic of an embodiment of a power semiconductor circuit with bidirectional power switching using anti-series configured main switches. In embodiments bidirectional conduction and voltage blocking are provided via the embodiment of the power semiconductor circuit 700 illustrated in FIG. 7. The power semiconductor circuit 700 of FIG. 7 includes a mechanical switch (isolation switch) 702, and two anti-series configured main switches 704 and 706 of the main branch 708, and two reverse-parallel $R^2CD$ snubbers 710 and 712 in a snubber branch 716. The reverse-parallel $R^2CD$ snubbers 710 and 712 include resistors 718, capacitors 720, and diodes 722. In embodiments, resistor 724 may be a static resistor that is coupled in parallel with each of the reverse-parallel $R^2CD$ snubbers 710 and 712. The power semiconductor circuit 700 include a clamping branch 726 that further includes a capacitor (blocking capacitor) 728 coupled in series with a MOV 730 that is paralleled with a resistor 732. In embodiments the bidirectionality provided by the architecture illustrated in FIG. 7 may also be achieved by using a diode bridge that is coupled in parallel with the clamping branch 726 and snubber branch 716, respectively.

Figure 8:
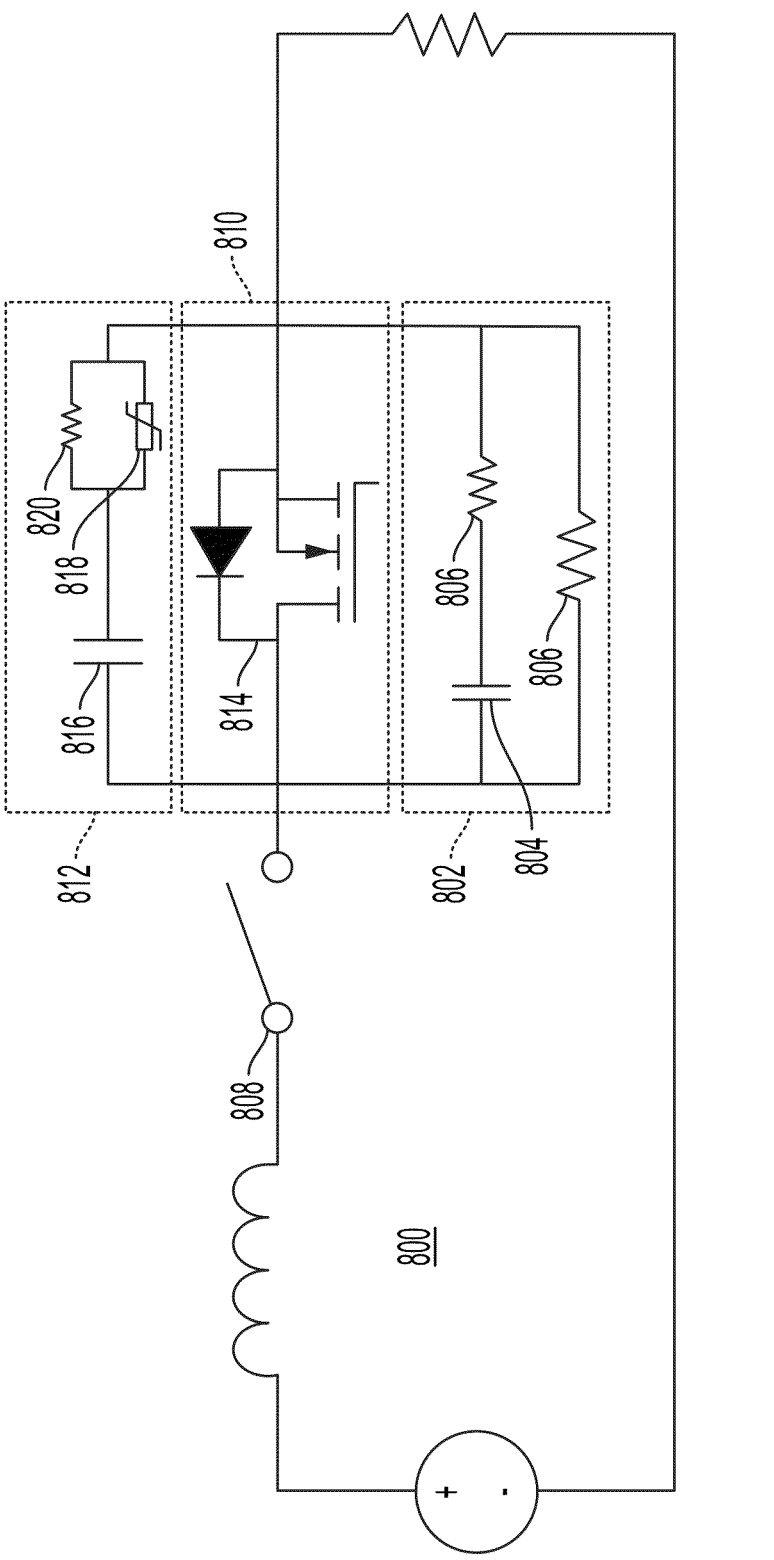
FIG. 8 illustrates a schematic of an embodiment of a power semiconductor circuit with unidirectional power switching using $R^2C$ network branch.

FIG. 8 illustrates a schematic of an embodiment of a power semiconductor circuit with unidirectional power switching using $R^2C$ network branch. The power semiconductor circuit 800 of FIG. 8 includes a modified snubber branch 802 that includes a $R^2C$ network comprised of a capacitor 804, and two resistors 806. The RCD snubber branch of FIG. 7 is substituted by a bidirectional RC snubber branch in the configuration depicted in FIG. 8. The power semiconductor circuit 800 includes a mechanical switch (switch) 808, a main branch 810, and a clamping branch 812. The main branch 810 may include main switch or power semiconductor switch 814. The clamping branch 812 may include a capacitor (blocking capacitor) 816 coupled in series with a MOV 818 that is paralleled with a resistor 820. In embodiments, the $R^2C$ network of the RCD snubber branch 802 and the clamping branch 812 are intrinsically bidirectional, a power semiconductor circuit can also be bidirectional by using anti-series main switches as depicted in FIG. 7. Bidirectionality can also be enabled by using a unidirectional main branch, an $R^2C$ network branch (802), the clamping branch, such as clamping branch 812, and a diode bridge that is coupled in parallel with the $R^2C$ network branch and the clamping branch.

While the disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the disclosure refer to an embodiment of the disclosure and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:
1. A power semiconductor circuit, comprising:
a power semiconductor switch;
a clamping branch coupled in parallel with the power semiconductor switch comprising:
  a first capacitor; and
  a surge arrester coupled in parallel with a first resistor, wherein the first capacitor is coupled in series with the surge arrester and the first resistor;

a snubber branch coupled in parallel with the power semiconductor switch and the clamping branch comprising:

a second capacitor;

a plurality of resistors coupled in parallel with one another; and a diode coupled in parallel with the plurality of resistors, wherein the second capacitor is coupled in series to a first resistor of the plurality of resistors and the diode and is coupled in parallel with a second resistor of the plurality of resistors; and an isolation switch coupled in series with the power semiconductor switch.

2. The power semiconductor circuit according to claim 1, wherein the power semiconductor switch changes to an off state in response to a fault occurring on a load side of the power semiconductor circuit.

3. The power semiconductor circuit according to claim 2, wherein the isolation switch is configured to change to the off state upon expiration of a certain time period subsequent to the power semiconductor switch changing to the off state to block leakage current.

4. The power semiconductor circuit according to claim 2, wherein a current corresponding to the fault is directed to the snubber branch in response to the power semiconductor switch changing to the off state.

5. The power semiconductor circuit according to claim 4, wherein the current corresponding to the fault is directed to the clamping branch in response to the surge arrester reaching a clamping voltage.

6. The power semiconductor circuit according to claim 5, wherein the current corresponding to the fault decreases in magnitude in response to the clamping voltage being greater than a direct current (DC) voltage of source voltage of the power semiconductor circuit.

7. The power semiconductor circuit according to claim 1, wherein the diode is coupled in series with the second capacitor.

8. The power semiconductor circuit according to claim 1, wherein the surge arrester is a varistor or a metal oxide varistor (MOV).

9. The power semiconductor circuit according to claim 1, wherein the power semiconductor switch includes at least one of a metal-oxide-semiconductor field-effect transistor (MOSFET) switch, an insulated-gate bipolar transistor (IGBT) switch, integrated gate-commutated thyristors (IG-CTs), bipolar transistors, Darlington transistors, field effect transistors (FETs), silicon controlled rectifiers (SCRs), thyristors, triacs, or unijunction transistors.

10. The power semiconductor circuit according to claim 3, wherein the power semiconductor switch changes to an on state in response to a current of the fault being dissipated via the snubber branch and the clamping branch to discharge the first capacitor, and wherein the isolation switch turns to the on state after a present interval to prepare for reclosing.

11. The power semiconductor circuit according to claim 1, further comprising another power semiconductor switch coupled in series with the power semiconductor switch and coupled in parallel with the snubber branch and the clamping branch, wherein the power semiconductor switch and the another power semiconductor switch provide bidirectional power switching for the power semiconductor circuit.

12. The power semiconductor circuit according to claim 11, wherein the snubber branch further comprises a third capacitor and another diode.

13. A power semiconductor circuit, comprising:

a power semiconductor switch;

a clamping branch coupled in parallel with the power semiconductor switch comprising:

a first capacitor; and a surge arrester coupled in parallel with a first resistor, wherein the first capacitor is coupled in series with the surge arrester and the first resistor;

a snubber branch coupled in parallel with the power semiconductor switch, and the clamping branch, the snubber branch comprising:

a first snubber and a second snubber coupled in parallel with one another, the first snubber and the second snubber each comprising:

a second capacitor;

a resistor; and a diode.

14. The power semiconductor circuit according to claim 13, further comprising an isolation switch coupled in series with the power semiconductor switch.

15. The power semiconductor circuit according to claim 14, wherein the power semiconductor switch changes to an off state in response to a fault occurring on a load side of the power semiconductor circuit, and wherein the isolation switch is configured to change to the off state upon expiration of a certain time period subsequent to the power semiconductor switch changing to the off state to block leakage current.

16. The power semiconductor circuit according to claim 13, wherein the power semiconductor circuit further comprises a plurality of diodes coupled in parallel with the clamping branch and the snubber branch to provide bidirection current conduction capability.

17. A power semiconductor circuit, comprising:

a power semiconductor switch;

a clamping branch coupled in parallel with the power semiconductor switch comprising:

a first capacitor; and a surge arrester coupled in parallel with a first resistor, wherein the first capacitor is coupled in series with the surge arrester and the first resistor;

a snubber branch coupled in parallel with the power semiconductor switch and the clamping branch, the snubber branch comprising:

a second capacitor; and a plurality of resistors coupled in parallel with one another, wherein the second capacitor is coupled in series to a first resistor of the plurality of resistors and is coupled in parallel with a second resistor of the plurality of resistors; and an isolation switch coupled in series with the power semiconductor switch.

* * * * *